United States Patent

[11] 3,545,351

| [72] | Inventors | Erich Hahn;<br>Lothar Brust, Dresden, Germany |
|---|---|---|
| [21] | Appl. No. | 706,238 |
| [22] | Filed | Feb. 19, 1968 |
| [45] | Patented | Dec. 8, 1970 |
| [73] | Assignee | VEB Pentacon Dresden Kamera-und<br>Kinowerke<br>Dresden, Germany |

[54] PHOTOGRAPHIC CAMERA WITH EXPOSURE METER
8 Claims, 3 Drawing Figs.

[52] U.S. Cl.................................................. 95/10,
 95/64, 356/218, 356/228
[51] Int. Cl.................................................. G01j 1/16,
 G03b 7/00
[50] Field of Search.......................................... 95/10(C),
 64(B); 356/218, 228

[56] References Cited
UNITED STATES PATENTS
3,000,280 9/1961 Faulhaber.................... 95/10(C)UX 3,073,222 1/1963 Broschke...................... 95/10(C)UX
3,094,053 6/1963 Lieser........................... 95/10(C)UX
3,194,134 7/1965 Swarofsky et al............. 95/10(C)UX

*Primary Examiner*—John M. Horan
*Assistant Examiner*—Joseph F. Peters, Jr.
*Attorney*—Young & Thompson ABSTRACT: A photographic camera having an exposure meter device in which a photoelectric cell thereof, within the camera housing is illuminated by image rays of an objective lens of the camera. The rays pass through a lens diaphragm prior to illumination of the photoelectric cell, which is settable in a fully open position or a partly closed position to any desired diaphragm aperture. The exposure meter device includes a reference value selector for providing a reference for the device according to the setting of the lens diaphragm, balance or shutter speed ring adjustable relative to the reference value selector and an indicator for determining the point of balance of the device, whereby camera exposure factors are obtained relative to the reference.

3,545,351

PHOTOGRAPHIC CAMERA WITH EXPOSURE METER

BACKGROUND OF INVENTION

The invention relates to a photographic camera with an exposure measuring device of which the photoelectric cell is illuminated by the path of the image rays of a taking lens equipped with a diaphragm device independent of the exposure meter.

For known cameras of this type the user has available not only taking lenses of different initial apertures but also taking lenses of which the diaphragm devices ensure that the exposure is only measured in the case of the "working diaphragm" or in the case of the fully open diaphragm, as the case may be. In addition, the photographer can have available taking lenses which, being equipped with a stop-down lever for exposure measurements, are suitable both with an "open diaphragm" and with a "working diaphragm." In contrast to this, however, the known cameras are constructed solely for one or other type of exposure measuring operation, so that it is not possible to choose between exposure measurement with "open diaphragm" and exposure measurement with "working diaphragm."

The purpose of the invention is to equip cameras of the type mentioned at the beginning with a new kind of exposure measuring device, in order to enable taking lenses with different diaphragm devices to be used as desired.

SUMMARY OF THE INVENTION

The invention enables this object to be achieved by a system in which a reference-value selector which can be switched over at will to the ranges for measuring the brightness of the subject with fully opened diaphragm ("open diaphragm"), and with a diaphragm ("working diaphragm") set to a certain diaphragm value, is provided for the setting device which is coupled with the exposure meter in the known manner via an adjusting resistance, the restoring spring of the rotating coil or a rotatable galvanometer, the reference-value selector having, in the range of the measurement with "open diaphragm," a diaphragm scale with geometrically graduated diaphragm values and with linear graduations and also having, in the range of the measurement with "working diaphragm," a setting mark, and being adjustable, as desired, in relation to a fixed index on the housing, by means of the diaphragm scale or by means of the setting mark. In one advantageous version of the invention, the setting device of the exposure meter takes the form of a scale support with values for further exposure factors, its scales having the same kind of linear graduation as the diaphragm scale of the reference-value selector and bearing geometrical numbers. In order to render it possible, when changing over from the exposure measuring operation with working diaphragm to the exposure measuring operation with open diaphragm, to take into account the usual commercial difference between the rated maximum aperture for the lens diaphragm, as stated on the taking lenses, and the effective maximum aperture setting actually obtainable, the reference-value selector is coupled with a correction device for the exposure meter, which said correction device is rendered operative in the case of exposure measuring operations with open diaphragm and which compensates the difference mentioned. The correction device preferably consists of a correction resistance which can be switched on by means of a contact coupled with the reference-value selector. It is advisable for the correction resistance to be adjustable in accordance with a correction scale graduated in accordance with the various commercially customary differences between the rated magnitudes stated and the effective maximum diaphragm apertures to which taking lenses can be set. To prevent erroneous settings, a further version of the invention provides that the reference-value selector is to be coupled with a covering strip which, when the setting mark and the fixed index on the housing are placed opposite each other, i.e. in the case of measuring operations with working diaphragm, covers the diaphragm scale of the reference-value selector. It is desirable for the covering strip to be coupled with the shift bar of the correction device.

BRIEF DESCRIPTION OF DRAWINGS

The invention will be explained in conjunction with constructional examples illustrated and described herein, in which:

In a housing 1 not shown separately (cf. FIGS. 1 and 2) of a reflex view-finder attachment which can be connected with the camera housing, a photoelectric measuring circuit in the form of a wheatstone bridge is accommodated. Parallel to the battery 2 is the potentiometer R 3/4, with which the tuning resistances R5 and R6 are connected in series. One branch of the bridge contains the photoelectric resistance R ph and the other the adjusting resistance R2 and the correction resistance R1, these latter being in series; the correction resistance R1 can be bridged by a switch contact 3, adjustably in accordance with a correction scale 14 with values for commercially customary relative differences between the rated maximum aperture of the lens diaphragm, as given on the taking lenses, and the settable effective maximum aperture. The sliding contact 4 of the potentiometer R 3/4 is electrically connected with the measuring mechanism 5 situated in the diagonal branch.

Figure 1:
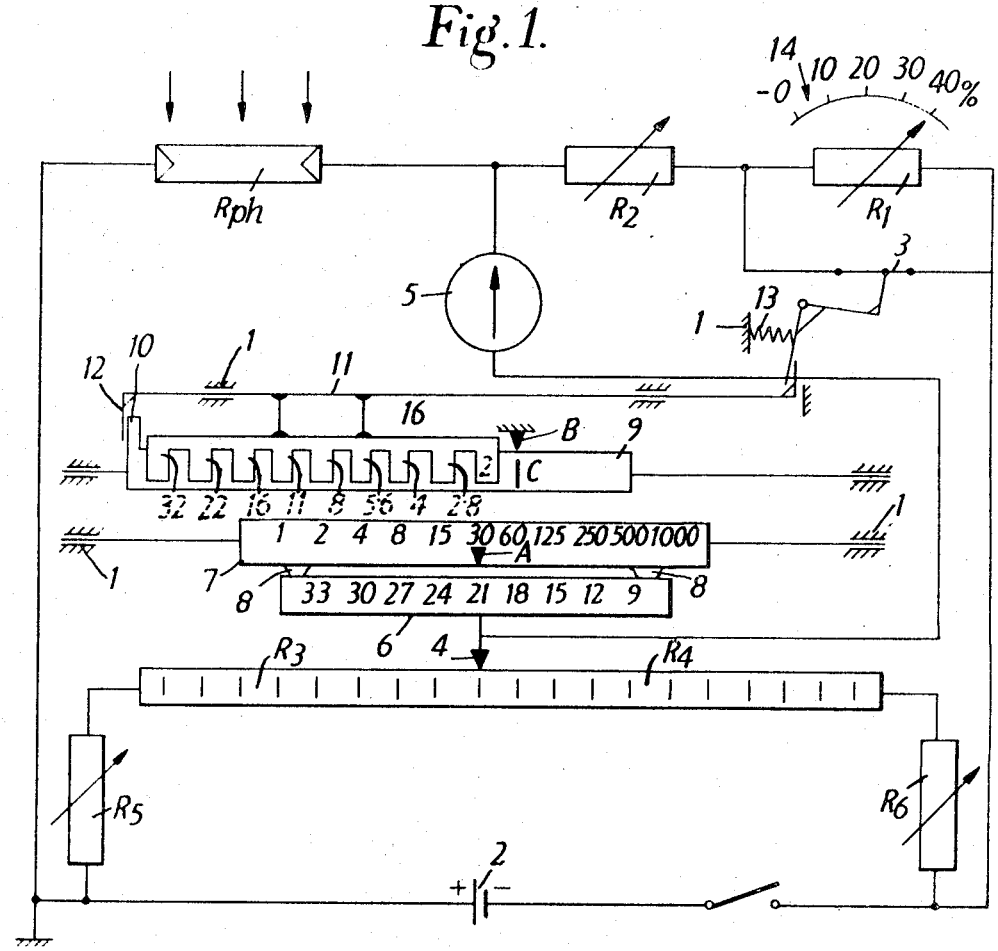
FIG. 1 shows an exposure measuring device with the reference-value selector set for measuring with working diaphragm, and with correction resistance.

The sliding contact 4 of the potentiometer R 3/4 is rigidly connected with a scale support 6 bearing values for film speeds, and the support is coupled by lugs 8 with a setting device 7 bearing values for different exposure times, so as to be alineable in different relative positions with the mark A. The setting device 7 is mounted so as to be movable. Opposite the setting device 7 is mounted an reference value selector 9, which can be moved parallel therewith. The reference value selector 9 is provided with a diaphragm scale including all the usual maximum rated aperture values used with cameras and also with a setting mark C, and is adjustable in relation to a fixed index B on the housing of the camera. In the path of a trip cam 10 is situated a shift arm 12 of a shift rod 11, which interacts with the switch contact 3. A pressure spring 13 tends at all times to move the switch contact 3 into an open position.

The method of operation of the exposure measuring device is as follows:

If a brightness measuring operation is to be carried out with the diaphragm closed to a set or preselected aperture value, i.e. with a "working diaphragm," then the reference value selector 9 is moved so that its setting mark C is opposite the fixed index B of the housing (see FIG. 1). During this movement the trip cam 10 engages the shift arm 12 of the shift rod 11 and moves it in opposition to the pressure spring 13, so that the switch contact 3 is closed and the correction resistance R1 is bridged. The film speed value, such as 21, corresponding to the type of film used is then placed opposite the mark A by relative movement of scale support 6 and setting device 7; a preselected exposure time, e.g. one-sixtieth seconds, is then positioned opposite the mark C by moving the setting device 7 which is coupled for movement with the scale support 6 by means of lugs 8. In order to balance the bridge circuit a diaphragm ring of the taking lens (not shown in the drawing) is rotated so that the diaphragm aperture is altered until the amount of light incident upon the photoelectric resistance Rhp which lies behind the diaphragm, is such that no current flows through the meter 5, i.e. the meter indicator is placed at zero, coinciding with a fixed mark, at which point the desired aperture is indicated on the diaphragm ring. If now, in view of the depth of focus required, it is necessary to operate the diaphragm with a correspondingly smaller diaphragm aperture, the aperture is first set by altering the diaphragm ring, after which the setting device 7, together with the scale support 6 and the sliding contact 4, is moved thereby changing the resistance ratio of potentiometer R 3/4 until the indicator of the measuring mechanism or meter 5 no longer shows any deflection, i.e. is situated opposite to the fixed mark. In this position the necessary exposure time value, e.g. one-sixtieth seconds, can be read off at the mark C. The exposure time reading is then set with a shutter time selector (not shown) of the camera before the camera is ready for an exposure. In order to avoid the incorrect transfer of settings from the exposure meter device to the camera diaphragm ring and shutter speed selector a covering strip 16 is provided, which is coupled with the shift rod 11 and which, in the case of measuring operations with the working diaphragm, covers over the diaphragm scale of the reference value selector 9.

If the exposure measuring device illustrated and described is built into the actual housing of a photographic camera, the exposure measuring device can be operatively connected, in a suitable manner, with the time selection device.

Figure 2:
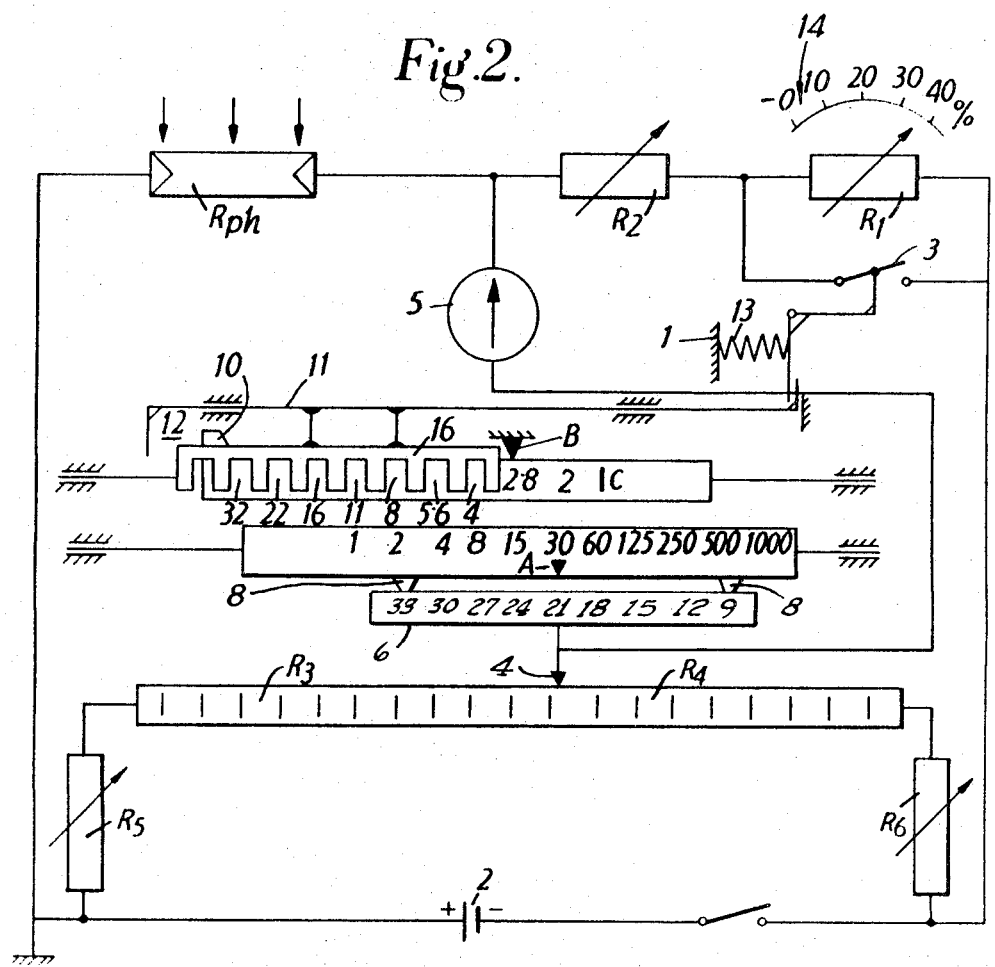
FIG. 2 shows the exposure measuring device in accordance with FIG. 1, the reference-value selector being set to measuring with open diaphragm.

If a brightness measuring operation is to be carried out with the diaphragm completely open, i.e. with "open diaphragm," then the reference-value selector 9 is positioned with the diaphragm scale value which corresponds to the maximum rated aperture indicated for the taking lens of the camera being used, opposite to the fixed index B on the housing (see FIG. 2), the maximum rated aperture in the present case being 2.8, for example, In this position the trip cam 10 has moved away from the shift arm 12 of the shift rod 11, so that the pressure spring 13 can open the switch contact 3. The percentage difference between the maximum rated aperture of the lens diaphragm, as stated on the taking lens, and its effective aperture, which difference can be easily determined by a suitable comparative measuring operation, is compensated for by the correction resistance R1, in accordance with the percentage correction scale 14. The setting device 7 is then moved, together with the coupled scale support 6 indicating film speed and the sliding contact 4 until the measuring mechanism or meter 5 no longer shows any deflection thereby indicating that the bridge is in balance. With the setting device 7 in this position pairs of values for diaphragm and exposure time which provide suitable exposure can be determined, such as diaphragm 4 on the reference value selector 9 and exposure time one-eighth on the setting device 7, by reading off the values and setting both on the diaphragm selector of the taking lens and the shutter time selector of the camera shutter.

Figure 3:
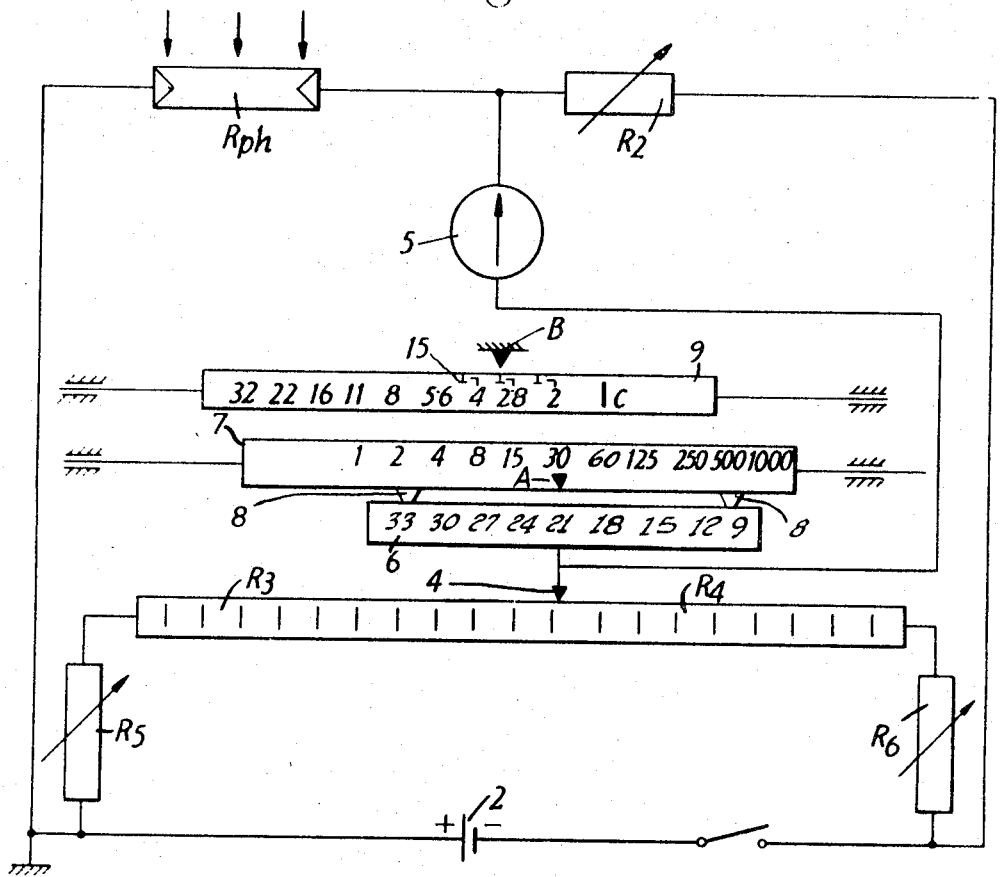
FIG. 3 shows an exposure measuring device with the reference-value selector set to measuring with open diaphragm, and with correction scale.

In a further example of the invention (cf. FIG. 3) the correction resistance R1 (cf. FIGS. 1 and 2) situated in series with the adjusting resistance R2 has been dispensed with. As a correction device for use in cases of optional brightness measurement with "open diaphragm," a correction scale 15 is provided on the reference-value selector 9 and opposite the fixed index B of the housing and is provided with marks for the commercially customary difference between the rated maximum aperture of the lens diaphragm, as given on the taking lenses, and the effective maximum aperture. Before the intended brightness measuring operation is carried out, with "open diaphragm," the reference value selector 9 is to be placed opposite the fixed index B of the housing, in accordance with the reading of the said correction scale 15. The measuring operation is then repeated in the manner described in the explanation given in conjunction with FIGS. 1 and 2.

We claim:

1. In a photographic camera including a camera housing, an objective lens mounted in said housing, a lens diaphragm mounted behind the objective lens, said diaphragm being settable in a fully open position "open diaphragm" or a partly closed position "working diaphragm" to any desired diaphragm setting, and exposure meter means including a photoelectric cell mounted in said housing behind said lens diaphragm so as to be illuminated by image rays arranged to pass through said objective lens and lens diaphragm, the provision of a reference value selector slidably mounted relative to said housing for providing a reference for said exposure meter means in accordance with the setting of said lens diaphragm in its "open" or "working" diaphragm positions, balance means having shutter speed markings thereon being slidably mounted relative to said reference value selector, and indicator means connected with said device for indicating the state of balance of said device, whereby unknown exposure factors are obtainable relative to said reference.

2. A camera as claimed in claim 1 wherein the exposure meter means takes the form of a wheatstone bridge arrangement including the photoelectric cell which forms one arm of the bridge, a variable resistance which forms a second arm of the bridge and a potentiometer arrangement which forms the third and fourth arms of the bridge, the potentiometer arrangement constituting the balance means thereof.

3. A camera as claimed in claim 2, wherein the exposure meter means includes correction means coupled with the reference value selector and a fixed index mark on the camera housing, so that when the reference value selector is in a position in which an aperture mark of a diaphragm aperture scale of the reference value selector is situated opposite the fixed index mark, the difference between the maximum rated aperture of the lens diaphragm, and its maximum effective aperture is arranged to be balanced out.

4. A camera as claimed in claim 3 wherein the correction means includes a correction resistance, a switch contact arranged to bridge the correction resistance and a shift rod interposed between the switch contact and reference value selector, said switch contact being controllable by the reference value selector via the shift rod, the resistance value of the correction resistance effectively corresponding to the percentage difference between the maximum rated aperture and the maximum effective aperture to which the lens diaphragm is set.

5. A camera as claimed in claim 4, including a predetermined correction scale associated with the correction resistance for setting the correction resistance.

6. A camera as claimed in claim 5 including a covering strip coupled with the reference value selector for covering the diaphragm aperture scale of the reference value selector when a setting mark on the reference value selector is situated opposite the fixed index on the camera housing with the lens diaphragm set in the "working diaphragm" position.

7. A camera as claimed in claim 6, wherein the covering strip is coupled with the shift rod of the correction means.

8. A camera as claimed in claim 3 wherein the correction means include a correction scale which is additional to the diaphragm aperture scale of the reference value selector and which bears figures corresponding to selectable maximum effective apertures of the diaphragms of the objective lenses.